United States Patent
Berson et al.

(10) Patent No.: US 7,486,291 B2
(45) Date of Patent: *Feb. 3, 2009

(54) SYSTEMS AND METHODS USING ENHANCED VISION TO PROVIDE OUT-THE-WINDOW DISPLAYS FOR A DEVICE

(76) Inventors: Barry L. Berson, 19240 Kenya St., Northridge, CA (US) 91326; Larry J. Bialecki, 28355 Patricia Hill Dr., Canyon Country, CA (US) 91387; Peter A. Buck, 26056 Amable Ct., Valencia, CA (US) 91355

(*) Notice: Subject to any disclaimer, the term of this patent is extended or adjusted under 35 U.S.C. 154(b) by 252 days.

This patent is subject to a terminal disclaimer.

(21) Appl. No.: 10/615,634

(22) Filed: Jul. 8, 2003

(65) Prior Publication Data

US 2005/0007386 A1 Jan. 13, 2005

(51) Int. Cl.
  *G06T 15/20* (2006.01)
(52) U.S. Cl. .................. 345/427; 345/619; 434/980
(58) Field of Classification Search ............... 345/427, 345/428
  See application file for complete search history.

(56) References Cited

U.S. PATENT DOCUMENTS

| | | | |
|---|---|---|---|
| 4,887,298 A | 12/1989 | Haigler | |
| 5,920,315 A | 7/1999 | Santos-Gomez | |
| 6,281,896 B1 | 8/2001 | Alimpich et al. | |
| 6,381,519 B1* | 4/2002 | Snyder | 701/3 |
| 6,405,975 B1* | 6/2002 | Sankrithi et al. | 244/1 R |
| 6,466,235 B1 | 10/2002 | Smith et al. | |
| 6,809,704 B2* | 10/2004 | Kulas | 345/1.2 |
| 6,842,122 B1* | 1/2005 | Langner et al. | 340/945 |
| 6,903,752 B2* | 6/2005 | Ebersole et al. | 345/632 |
| 7,180,476 B1* | 2/2007 | Guell et al. | 345/7 |
| 2001/0048763 A1 | 12/2001 | Takatsuka et al. | |
| 2002/0059614 A1* | 5/2002 | Lipsanen et al. | 725/75 |
| 2004/0059474 A1* | 3/2004 | Boorman et al. | 701/14 |
| 2004/0169663 A1* | 9/2004 | Bernier | 345/629 |
| 2004/0210847 A1 | 10/2004 | Berson | |

OTHER PUBLICATIONS

Jennings et al., "Synthetic Vision as an Integrated Element of an Enhanced Vision System", presented Apr. 1, 2002 at SPIE AeroSense Conference 2000 in Orlando, Flordia.*

Guell, Jeff; "FLILO (FLying Intrared for Low-level Operations) an Enhanced Vision System", presented Apr. 2000 at SPIE AeroSense Conference 2000 in Orlando, Florida.*

(Continued)

*Primary Examiner*—Ulka Chauhan
*Assistant Examiner*—Daniel F Hajnik
(74) *Attorney, Agent, or Firm*—Koestner Bartani LLP; Mary Jo Bertani

(57) ABSTRACT

A display system for a operating a device receives images from a first sensor and a second sensor that represent scenery outside the device. The display system is configured to detect moving objects in the images, as well as fuse the images to a single viewpoint. The fused image is transformed to a first viewpoint image from a first operator station in the device, and a second viewpoint image from a second operator station in the device. The first and second viewpoint images conform to the scenery outside the device from each operator station.

43 Claims, 8 Drawing Sheets

OTHER PUBLICATIONS

NASA, Nasa's High-Speed Reasearch Progralm, The eXternal Visibilit System Concept, NASA Facts Online, http://oea.larc.nasa.gov/PAIS/HSR-Cockpit.html., Sep. 1998, FS-1998-09-34-LaRC.

Michael D. Uenking & Monica F. Hughes, The Efficacy of Using Synthetic Vision Terrain-Textured Images to Improve Pilot Situation Awareness, NASA Langley Research CEnter, 2002-01-2970. pp. 1-12. USA.

Glenn Hines; Zia-Ur Rahman; Daniel Jobson; Glenn Woodell, Multi-image registration for an enhanced vision system, http://techreports.larc.nasa.gov/ltrs/PDF/2003/mtg/NASA-2003-aerosense-gdh.pdf.

Dan Williams, Marvin Waller, Dan Burdette, Tom Doyle, William Capron, John Barry, Richard Gifford, Concept of Operations for Commercial and Business Aircraft Synthetic Vision Systems, Jun. 2000, pp. 1-64, Version 1.0 (Draft).

Sharon Otero Beskenis; David F. Green, Jr.; Paul V. Hyer and Edward J. Johnson, Jr., Integrated Display System for Low Visibility Landing and Surface Operations, NASA/CR-1998-208446, Jul. 1998, pp. 1-58.

The Boeing Company, Synthetic Vision Systems (SVS) Concept Assessment Report, FY 00, Contract NAS1-20342, Dec. 31, 2000, pp. 1-40.

NASA, Nasa's High-Speed Research Program The eXternal Visibility System Concept, NASA facts online, http://oea.larc.nasa.gov/PAIS/HSR-Cockpit.html.

* cited by examiner

SYSTEMS AND METHODS USING ENHANCED VISION TO PROVIDE OUT-THE-WINDOW DISPLAYS FOR A DEVICE

BACKGROUND OF THE INVENTION

Many devices, such as aircraft, are typically designed to provide a view of the out-the-window scene for at least one operator to operate the device. In the past, a view of the scenery outside the device was provided through passive means, such as a cockpit windshield, or artificial means through sensors and displays.

Synthetic Vision Systems (SVS) present a completely artificial computer-generated view of the external environment to the crewmember(s). SVS displays are typically based on static geographical and cultural data supplemented by dynamic traffic information. Some implementations of SVS use Global Positioning Satellite (GPS) data to register the data base information dynamically to the aircraft's position and altitude. Supplemental sensors may be used to confirm the GPS position data or provide additional data (e.g., other aircraft, weather events, ground equipment). SVS can use both head-up and head-down displays. Displays typically include an artificial out-of-the-window view out the front and to the sides of the aircraft, and/or any number of symbolic and map presentations.

In contrast, Enhanced Vision Systems (EVS) supplement out-the-window vision via the use of camera/sensor imagery superimposed over real-world, or synthetic, imagery. EVS include sensors that can detect and display images of objects that pilots would not normally be able to see when looking through the cockpit window of an aircraft. For example, EVS can present data from sensors that can penetrate low-visibility weather conditions and darkness, such as RADAR or forward-looking infrared (FLIR). The data presented from the sensors is derived from the current environment and not from a computer database. EVS can be used on both head-down and head-up displays. Other features such as navigation enhancements and proactive systems to avoid controlled flight into terrain and runway incursions can also be integrated in EVS.

The development of synthetic and enhanced vision systems requires several different information technologies: (1) camera systems to provide visual imagery; (2) communication technology for transmitting navigation information; (3) databases to provide terrain data for synthetic images and object signatures to support imaging sensors; (4) computer graphics systems to render synthetic images in real time; (5) onboard imaging sensors, such as solid state infrared or imaging RADAR, to provide scene information through darkness and adverse weather; (6) knowledge-based image interpreters to convert sensor images into a symbolic description; and (7) navigation components integrated with a Global Positioning System or suitable navigation system.

Capabilities provided with SV and EV systems are gaining acceptance among aircraft crewmembers. In 1997, the National Aeronautics and Space Administration (NASA), the United States Federal Aviation Administration (FAA), along with several industry, airline, and university participants, began work on NASA's Aviation Safety Program (ASP). One purpose of the ASP is to develop technologies to enhance flight safety and enable consistent gate-to-gate aircraft operations in normal and low visibility conditions. Large format displays filled with high-resolution images and computer graphics are expected to be provided in the crewstation instead of forward-looking cockpit windows. The systems being developed for the ASP use new and existing technologies, such as Global Positioning System signals, terrain databases, and sensors to incorporate data into aircraft cockpit displays During ASP test flights, the crew flew approaches and landings from an aircraft equipped with a research cockpit and tested the ability to control and land the aircraft relying only on sensor and computer-generated images and symbology. Although the crews provided positive feedback on the capabilities of the system, windowless cockpits are not expected to be certified for use in commercial or general aircraft by the FAA until the year 2007 or beyond.

Currently, the FAA requires aircraft to provide out-the-window viewing capability with specified horizontal and vertical fields of view. In some circumstances, the configuration of aircraft designed for optimum performance at conditions such as supersonic flight can include a long, pointed nose for drag reduction. Additionally, most contemporary supersonic aircraft designs feature a modified delta wing optimized for high-speed flight that results in high angles of attack at lower speeds. The long nose and high angle of attack at low airspeeds impairs the FAA required forward visibility of the flight crew during some phases of operation.

One solution to reduced cockpit out-the-window visibility includes a movable nose cone, such as the droop-nose design of the Concorde aircraft. A mechanical system with actuators allows the crew to move the aircraft nose from a cruise position to a "drooped" position for takeoff, landing, and ground operation. The droop nose configuration requires additional weight and space for the actuator system, and increases the complexity of the aircraft.

Still another solution to enabling the pilot to see outside the airplane during approach and landing is to include cockpit windows at the lower front fuselage of the aircraft, instead of, or in addition to, the traditional location on the upper front fuselage. Such a configuration provides a window for each crewmember to view a limited portion of the runway during landing, as disclosed in U.S. Pat. No. 5,351,898 issued to Michael S. Koehn. Drawbacks associated with the configuration include increased drag due to the opening(s) in the bottom of the nose of the aircraft, and the loss of space in the nose for other aircraft components. Further, the windows provide very narrow horizontal and vertical fields of view that can impair the pilot's depth perception through lack of spatial references.

It is therefore desirable to provide a display system that overcomes the limitations currently associated with display system configurations for aircraft and other devices with reduced out-the-window visibility.

SUMMARY OF THE INVENTION

In one embodiment, a display system for a device receives images from a first sensor and a second sensor that represent scenery outside the device. The display system is configured to detect moving objects in the images, as well as fuse the images to a single viewpoint. The fused image is transformed to a first viewpoint image from a first operator station in the device, and a second viewpoint image from a second operator station in the device. The first and second viewpoint images conform to the scenery outside the device from each operator station.

In another embodiment, a method for providing an out-the-window visual scene on a display device includes receiving an image of a portion of the out-the-window visual scene from the viewpoint of each of two of a first type of sensor. The images from the first type of sensors are fused into a combined image to generate a first fused image. The fused image is transformed to a first operator viewpoint and to a second operator viewpoint. The first operator viewpoint image is output to a first display device and the second operator viewpoint image is output to a second display device. The display devices are positioned to provide the portion of a desired out-the window visual scene in combination with a window that provides another portion of the desired out-the-window visual scene.

In a further embodiment, a device includes a display device and a display processor. The display processor receives a first sensor image representing a portion of scenery outside the device, and transforms the first sensor image to a viewpoint image from an operator station in the device. The viewpoint image is sized and oriented to conform to the scenery outside the device from the operator station. The first operator viewpoint image is output to the display device, which is positioned to provide the portion of a desired out-the window visual scene in combination with a window that provides another portion of the desired out-the-window visual scene.

In a still further embodiment, an aircraft includes a crew-station with cockpit windows, a first display device for one crewmember, a second display device for another crewmember; and a display processor. The display processor is configured to receive an image of an out-the-window visual scene from the viewpoint of a first type of sensor; receive another image of a portion of the out-the-window visual scene from the viewpoint of another of the first type of sensor; fuse the images from the first type of sensors into a combined image to generate a first fused image; transform the fused image to a first operator viewpoint and to a second operator viewpoint; transform the first operator viewpoint image and the second operator viewpoint image to conform to the size and orientation of the out-the-window visual scene; and output the first operator viewpoint image to the first display device and the second operator viewpoint image to the second display device.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1A:
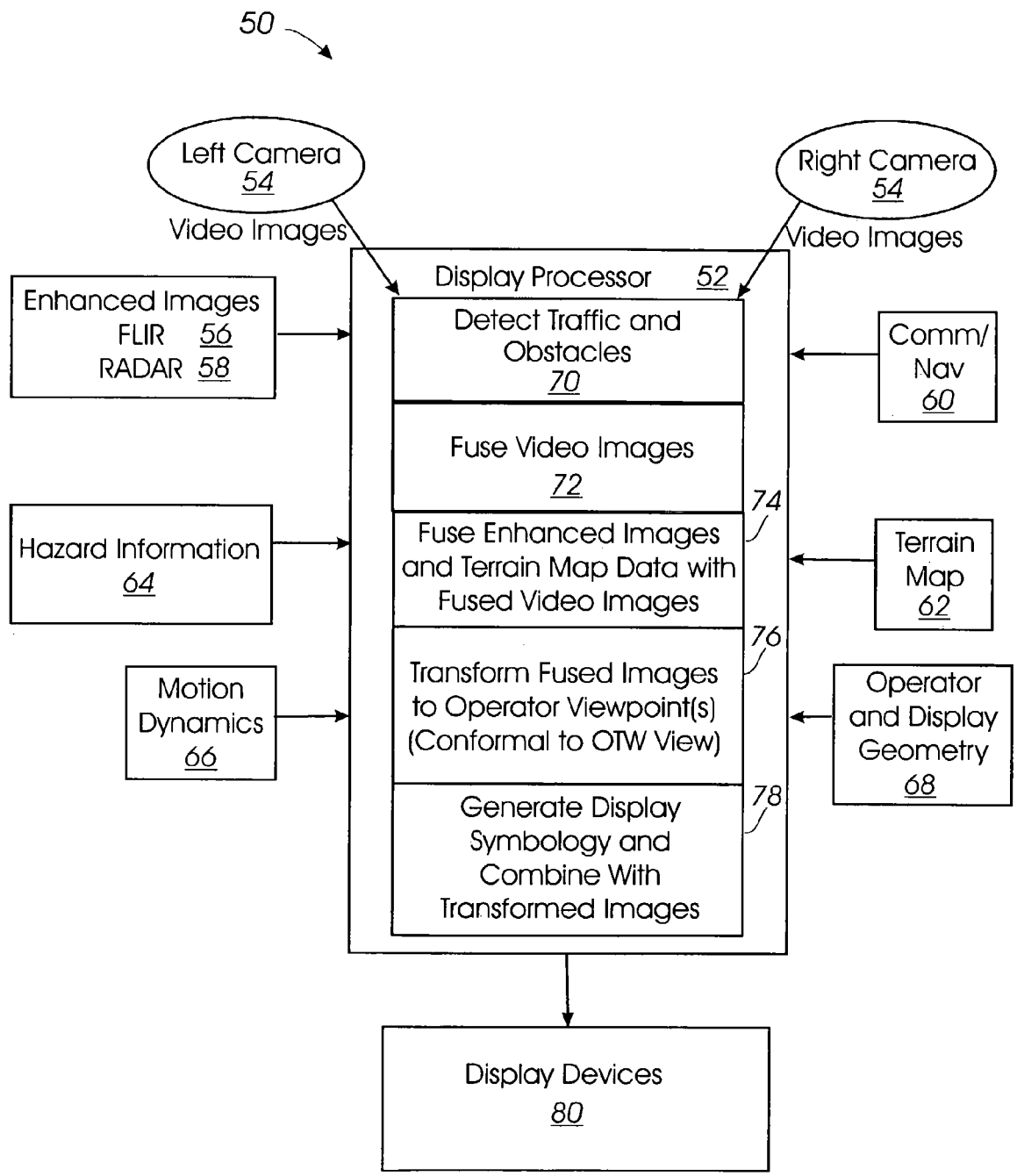
FIG. 1A is a diagram of an embodiment of a components and processes that can be included in a display system for a variety of types of devices.

FIG. 1A is a diagram of components and processes that can be included in an embodiment of a display system 50 for providing out-the-window displays for devices such as aircraft, trains, boats, and other types of devices where it is useful to have visual images of scenery, traffic, obstacles, and other objects surrounding the device. A variety of subsystems and sensors supply images and data to display processor 52. In some embodiments, sensors and subsystems such as video camera(s) 54, Forward-Looking Infrared (FLIR) sensor(s) 56, RADAR sensor(s) 58, communication and navigation systems 60, terrain map database 62, hazard information 64, motion dynamics information 66, and operator and display geometry information 68 provide information to display processor 52. Other suitable subsystems and sensors can be utilized for a particular device in addition to, or instead of, the components shown in FIG. 1A.

Information regarding the out-the-window scenery and/or objects outside the device can also be provided from sensors that are not on-board the device. In some embodiments, more than one of the same type of sensor is included in display system 50. In such embodiments, if one sensor fails, the image from another of the same type of sensor can be transformed to each operator's viewpoint, thereby improving the reliability of display system 50.

Display processor 52 includes one or more data processing devices configured to perform a variety of functions, such as detect traffic and obstacles 70; fuse video images 72; fuse enhanced images and terrain map data with video images 74; transform fused images to one or more operator viewpoints 76; and generate display symbology and combine with transformed images 78. The output of display processor 52 is presented to operator(s) of the device on one or more displays devices 80, which can include, for example, Head Up Display (HUD), Head Down Display (HDD), Primary Display (PD) and Multifunction Display (MFD). Display processor 52 can perform other functions in addition to, or instead of, the functions shown in FIG. 1A. Similarly, other display devices 80 can be utilized in addition to, or instead of, the display devices 80 shown.

One or more of functions 70 through 78 can be configured for parallel processing to reduce the latency of display system 52. For example, when two or more sensors of the same or different type are included in display system 52, the data from the sensors can be processed concurrently, such as several instances of detect traffic and obstacles function 70 running concurrently to analyze images from left and right cameras 54, FLIR images 56, RADAR images 58, and hazard information 64.

Additionally, display processor 52 can be embodied in any suitable computing device(s) using any suitable combination of hardware, software, and/or firmware, such as microprocessors, Field Programmable Gate Arrays (FPGAs), Application Specific Integrated Circuit (ASICs), or other suitable devices.

In some embodiments, display devices 80 can replace traditional instrument panels, and provide a portion of the out-the-window scenery in all weather and time of day conditions, even when the scenery is obscured by a portion of the structure of the device. Display images on display devices 80 can also provide interactive presentations of operation and subsystem mode information, and allow operators to control and monitor various subsystems and sensors at any particular time.

While embodiments disclosed hereinafter use an aircraft as an example of a device with a particular field of view desired for operation, embodiments of a display system 50 and images for display devices 80 disclosed herein can be utilized in any device with a limited out-the-window field of view.

Figure 1B:
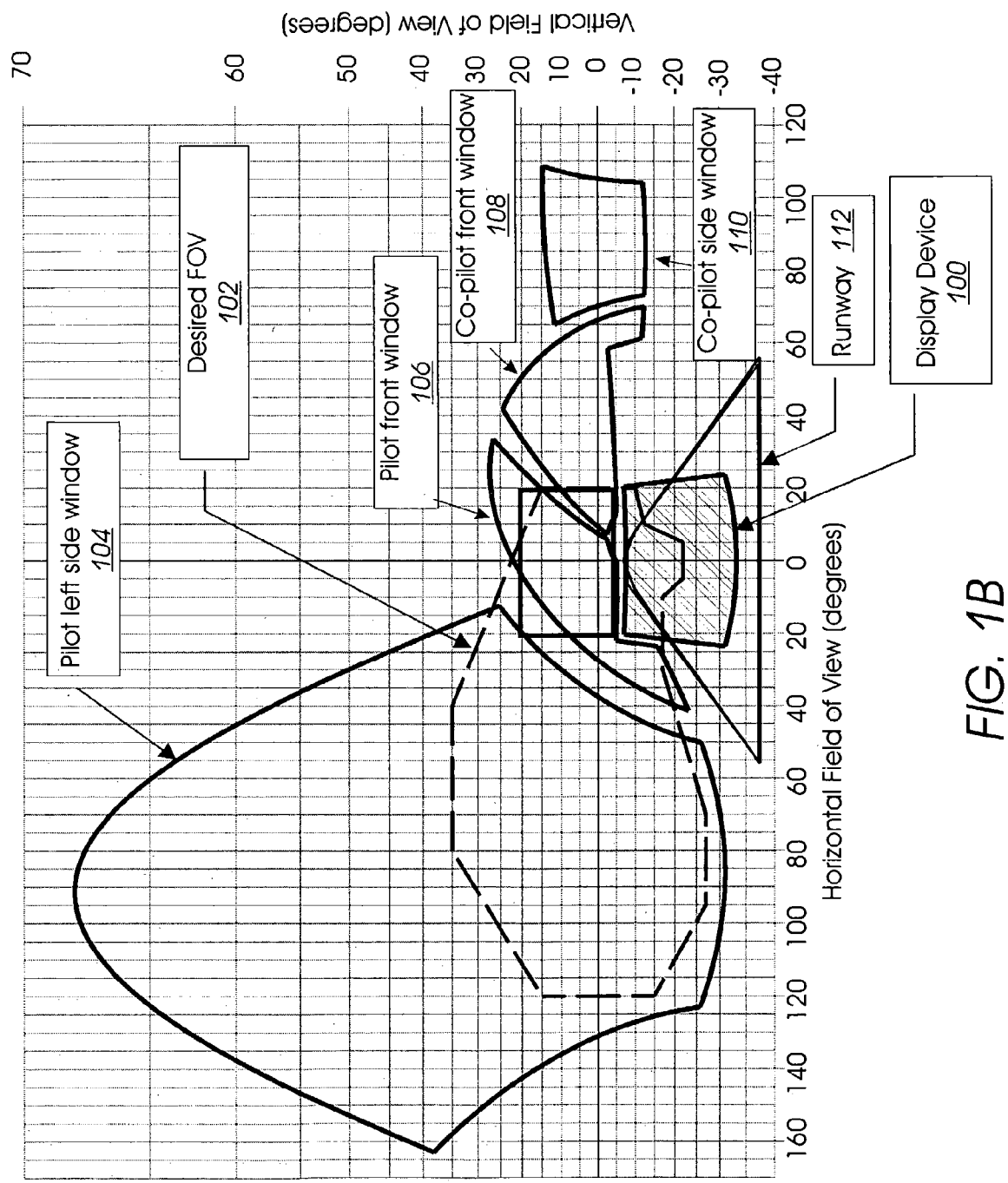
FIG. 1B is a diagram of an embodiment of a display device positioned to provide a required field of view for a crewmember in combination with out-the-window fields of view from cockpit windows.

FIG. 1B shows an embodiment of an out-the-window view from an operator's station combined with display device 100 that provides a portion of a desired field of view (FOV) 102, as indicated by a dashed line. Display system 50 (FIG. 1A) can be utilized to provide desired FOV 102. Desired FOV 102 can be derived from governmental or other regulations, such as set forth in the United States Federal Aviation Administration (FAA) Advisory Circular (AC) 25.773-1 entitled "Pilot Compartment View Design Considerations", dated Jan. 8, 1993. The out-the-window field of view areas for the operator in an exemplary aircraft are indicated by pilot left side window view 104, pilot front window view 106, co-pilot front window view 108, and co-pilot side window view 110. For other types of devices, desired FOV 102 will be based on the tasks to be performed, and structural characteristics of the device that may block a portion of desired FOV 102.

Figure 2:
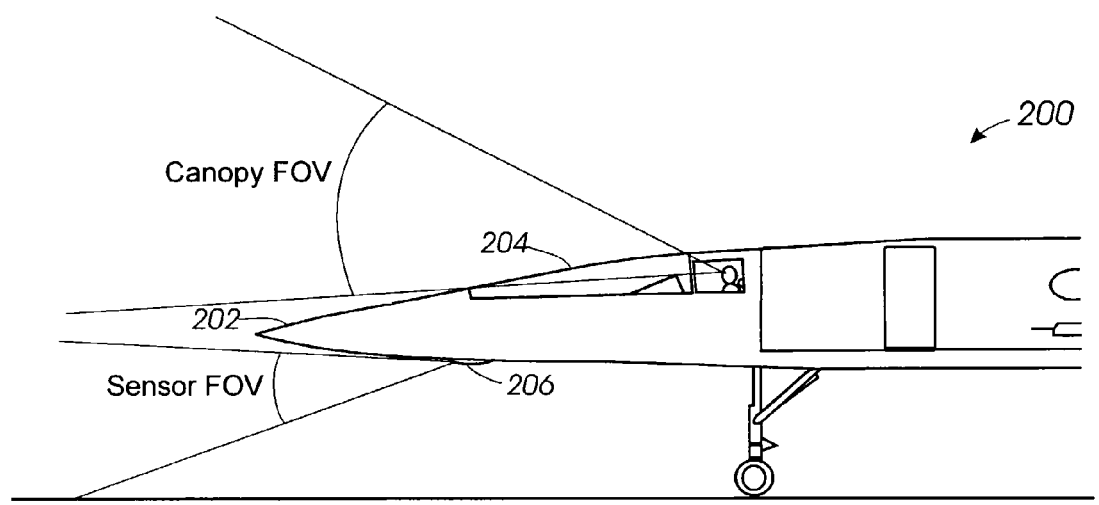
FIG. 2 is a diagram of an embodiment of an aircraft with a structural outer mold line that obscures a portion of a crewmembers required field of view.
Figure 3:
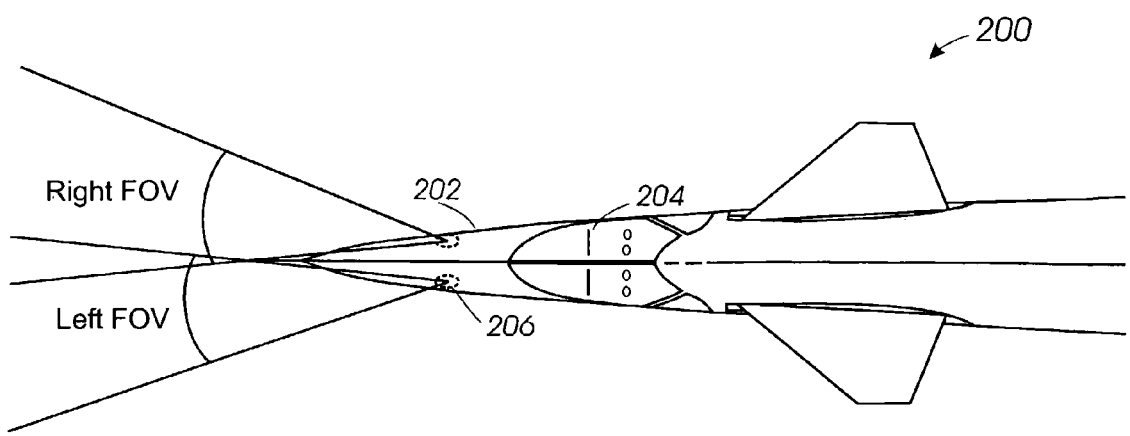
FIG. 3 is a side view diagram of the aircraft of FIG. 2.

Tradeoffs must typically be made between an aircraft's performance and other design goals, such as payload capacity, range, structural weight, speed, and fuel consumption of an aircraft. FIGS. 2 and 3 show an embodiment of an aircraft forward fuselage 200 with an outer mold line (OML) 202 and cockpit windows 204 that result in cockpit window views 104, 106, 108, 110 shown in FIG. 1B. The nose of aircraft 200 is long and tapered, and designed to meet low sonic boom and high speed requirements, such as for a supersonic aircraft. A tradeoff is required, however, between the length and shape of OML 202 to achieve reduced sonic boom, and an OML 202 that allows cockpit windows 204 to be sized to provide desired FOV 102.

Embodiments of display 100 can be implemented to provide portions of the out the window visual scene to fill in the area of desired FOV 102 that is not visible from cockpit window views 106, 108. Runway 112 (FIG. 1B) is shown in perspective to display 100, window views 104, 106, 108, 110, and desired FOV 102 with respect to the pilot of aircraft 200 during the flare portion of a landing sequence. Note that the shape and size of window views 104, 106, 108, 110 and display 100 can vary from the configuration shown in FIGS. 1B, 2, and 3.

Subsystems and Sensors

Referring again to FIGS. 1A and 2, video cameras 54 can provide a video image of a field of view in front of aircraft 200. Images from video camera 54 are useful to provide the crew with images of surrounding scenery obscured by the aircraft's OML 202 in daylight and good visibility conditions. Scenery images from camera sensor 54 can also be presented directly to the crewmembers on display 100 to assist the crew in operating aircraft 200 in manual and autopilot modes. Images from video camera 54 can be analyzed by functions, such as detect traffic and obstacles function 70, in display processor 52.

Forward Looking Infrared (FLIR) sensor 56 provides an infrared spectrum video image of a field of view in front of aircraft 200. FLIR images provide the ability to view surrounding scenery in day, night, and all-weather conditions. Additionally, display processor 52 can analyze FLIR images to monitor the integrity of data being used in display system 50, and detect objects around aircraft 200. Scenery images from FLIR sensor 56 can be transformed to crewmember's viewpoints and displayed directly to the crewmembers on display 100 to assist the crew in operating aircraft 200 in manual and autopilot modes.

RADAR sensor(s) 58 can include one or more different types of RADAR sensors to provide information regarding weather, air and surface traffic, precision velocity measurement for navigation system updates, altitude above ground information, scene imagery to the pilot in low visibility conditions, object detection (either directly through pilot scene interpretation, or automatically), and to monitor the integrity of data being used in display system 50. Raw data can be provided in the form of scanned RADAR returns, azimuth versus range, at incrementally selected elevations. Scenery images from RADAR sensor 58 can be transformed to crewmember's viewpoints, sized and oriented to conform to the view available from windows 104 through 110, and displayed directly to the crewmembers on display 100 to assist the crew in operating aircraft 200 in manual and autopilot modes.

Navigation components in communication and navigation subsystems 60 can include a variety of subsystems to determine the relative bearing and slant range distance to a ground station, to keep the device's present position and update the present position being kept by another source, such as an inertial navigation system (INS). The INS subsystem is a self-contained, fully automatic dead reckoning navigation system. The INS can be coupled to a Global Positioning System (GPS) to provide highly accurate present position and velocity data. The INS detects motion (acceleration and attitude) and provides acceleration, velocity, present position, pitch, roll, and true heading to related systems. The GPS is a space satellite based radio navigation system that provides continuous, all weather, passive operation to an unlimited number of users anywhere on the earth.

Other components in communication and navigation subsystems 60 can include an Attitude Heading Reference System (AHRS), which is a self-contained attitude reference system that provides backup pitch, heading, and roll attitude for use by other subsystems. An Instrument Landing System (ILS) is an all weather runway landing approach guidance system. The ILS decodes transmitted azimuth and elevation signals during an aircraft approach and provides steering information to be displayed on Head-Up Display (HUD) the Vertical and/or Horizontal Situation Indicator Display (HSID) and/or other appropriate displays 100. Other suitable components can be utilized in communication and navigation subsystems 60, in addition to, or instead of, the components mentioned herein. Other communication systems, such as a satellite communication system, data link, and high frequency radio systems, among others, can also be included.

Terrain map database 62 provides latitude, longitude, and elevation data for terrain and man-made structures of potential significance to hazard avoidance. The database may include nested components in hardware and/or software, with varying resolution and accuracy, appropriate to the phase of flight anticipated in the represented region. Terrain map database 62 can be used to provide scene imagery to the pilot in low visibility conditions, to detect objects in the surrounding area (either directly through pilot scene interpretation, or automatically), and to monitor the integrity of data being used in display system 50. Frequent updates to terrain map database 62 can be provided to include changes that may affect operation of aircraft 200. For example, the database can be updated to include recently constructed buildings and roads.

Other suitable components can be utilized in communication and navigation subsystems 60, in addition to, or instead of, the components mentioned herein.

Hazard information 64 can be provided by sensors and subsystems such as a Traffic Alert and Collision Avoidance System, or TCAS, to provide information regarding the relative positions and velocities of other aircraft or moving vehicles in the vicinity of the subject aircraft 200. Position, heading, and speed information can be included on display 100, and a visual, audio, or other type of alarm can issue when another aircraft or vehicle is on a path to pass within a predetermined range of aircraft 200. Hazards information 64 can also include other components to provide information relevant to operation of aircraft 200 of which the crewmembers should be aware, such as terrain awareness/avoidance.

Motion dynamics sensors 66 provide information regarding attitude, position, speed, acceleration in three-dimensional space for aircraft 200. Other information such as angle of attack, ambient air temperature outside the aircraft; a pitot static system to measure aircraft velocity with pitot and static pressures surrounding the aircraft; an indicated airspeed (IAS) value based on the pitot and static pressure; a backup pressure altimeter value based on static pressure; and a vertical speed (climb or dive rate) indicator value based on changes in static air pressure, can also be used. Other onboard and off-board sensors such as an INS can provide information to motion dynamics sensors 66.

Display Processor

Referring again to FIG. 1A, with regard to functions performed by display processor 52, detect traffic and obstacles function 70 analyzes video images from video cameras 54 and determines whether there are any moving or stationary objects in the vicinity of aircraft 200. If so, symbols can be included on displays presented on display devices 80 to alert operators to the presence of the objects. In some situations, symbols may not be presented on the displays if the objects can be easily seen in the video image on the display. Audible warnings can be presented in addition to visually presented symbols.

Fuse video images function 72 combine, also referred to as fuse, enhanced images and terrain map data with images from video cameras 54. In some embodiments, video images from cameras 54 are analyzed in parallel processing paths for moving and stationary objects. Under relatively high visibility conditions, the video images may be considered sufficient to provide desired FOV 102 (FIG. 1B) on display 100. In other situations, such as low visibility conditions, the function fuse enhanced images and terrain map data with fused video image 74 can generate a composite image for displays 100 using the best information available from various sources, such as FLIR 56, RADAR, 58, video cameras 54, and terrain map 62.

For example, data from the terrain map database can be compared to measured terrain height variations from a RADAR altimeter, INS, and GPS along the aircraft flight path to estimate the position of aircraft 200. Images from video cameras 54, RADAR sensors 58, and FLIR sensors 56 can be fused to form a composite out-the-window scenery image using any suitable image sensor fusion algorithm, such as described by Z. Rahman, D. J. Jobson, G. A. Woodell, and G. D. Hines, in a publication entitled "Multi-Sensor Fusion And Enhancement Using The Retinex Image Enhancement Algorithm," Visual Information Processing XI, Proc. SPIE 4736, (2002). Data from a 3-dimensional terrain map database can be used to fill in portions of data that is not available from video cameras 54, RADAR sensors 58, or FLIR sensors 56 to provide an enhanced image for display 100.

Transform fused images to operator viewpoints function 76 performs viewpoint transformation functions to align the fields of view of images from cameras 54, RADAR sensors 58, or FLIR sensors 56, and translate the images to the viewpoint of each crewmember. The fused image can be combined with display symbology to provide a further enhanced image for display 100. Transform fused images to operator viewpoints function 76 uses dimensional information from the crewstation, the configuration of displays 100, as well as motion dynamics information 66, to crop, rotate, and translate images to the viewpoint of each crewmember. In some embodiments, the following processes occur in viewpoint transformation function 528:

rotate the image about the viewpoint x, y, and z axes;

translate the image in the x, y, and z directions by an amount equal to the (negative) displacement of the viewpoint from the origin in the x, y, and z directions, respectively; and scale and crop all images to the same field of view to conform to out-the-window view.

Images used to provide a portion of desired FOV 102 (FIG. 1B) can be scaled and oriented to conform to the real world scenery for each crewmember's viewpoint. Appropriate coordinate system transformation matrices for different reference systems can be used, based on the original coordinate system of the image, and the coordinate system used for the design eye(s).

Generate display symbology and combine with transformed images function 78 overlays symbols representing information such as aircraft operational data and sensed external position and hazards. Navigation and other guidance cues can also be provided to allow aircraft 200 to be operated with reference to display 100.

Figure 4A:
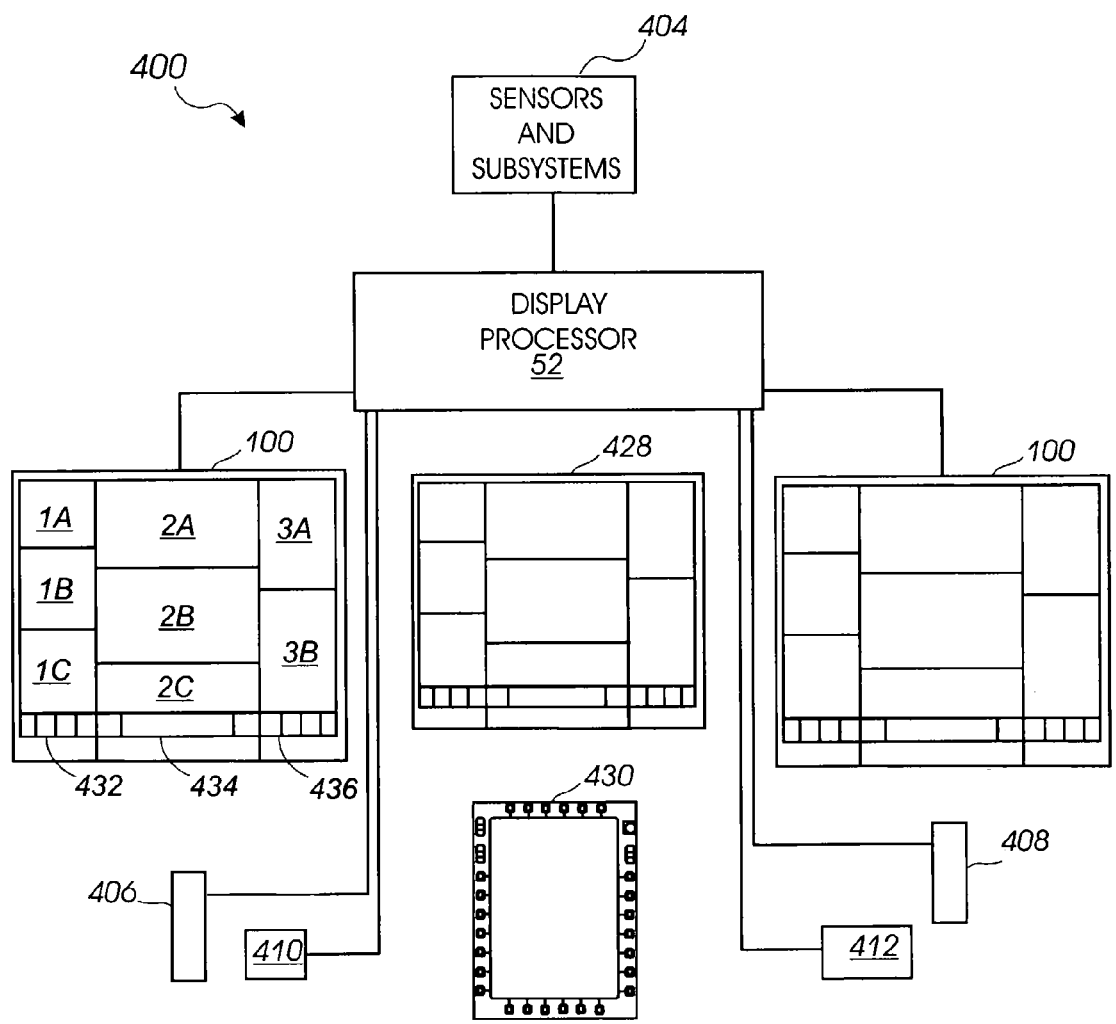
FIG. 4A is a diagram of an embodiment of a display system for the aircraft of FIG. 2.

FIG. 4A shows a diagram of an embodiment of a configuration of displays 100, 428, 430, in which one or more of displays 100, 428 can be partitioned into several mutually exclusive display areas, referred to as display windows 1A through 3B. Various types of information can be displayed in windows 1A through 3B based on the types of functions being performed by components in display system 50, devices being monitored via display system 50, and functions performed by devices that communicate with display system 50.

Figure 4B:
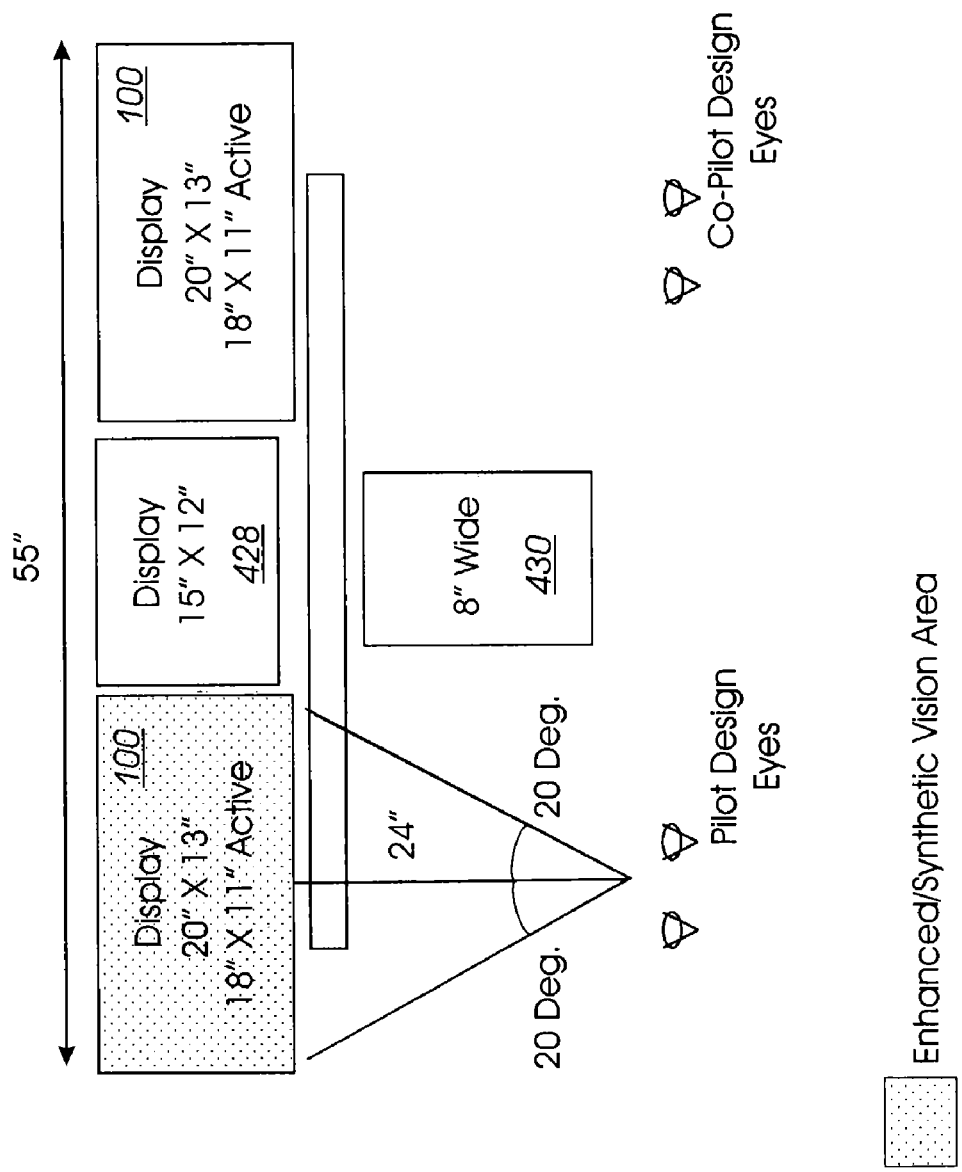
FIG. 4B is a front-view diagram of a particular embodiment of the display system of FIG. 4A.
Figure 4C:
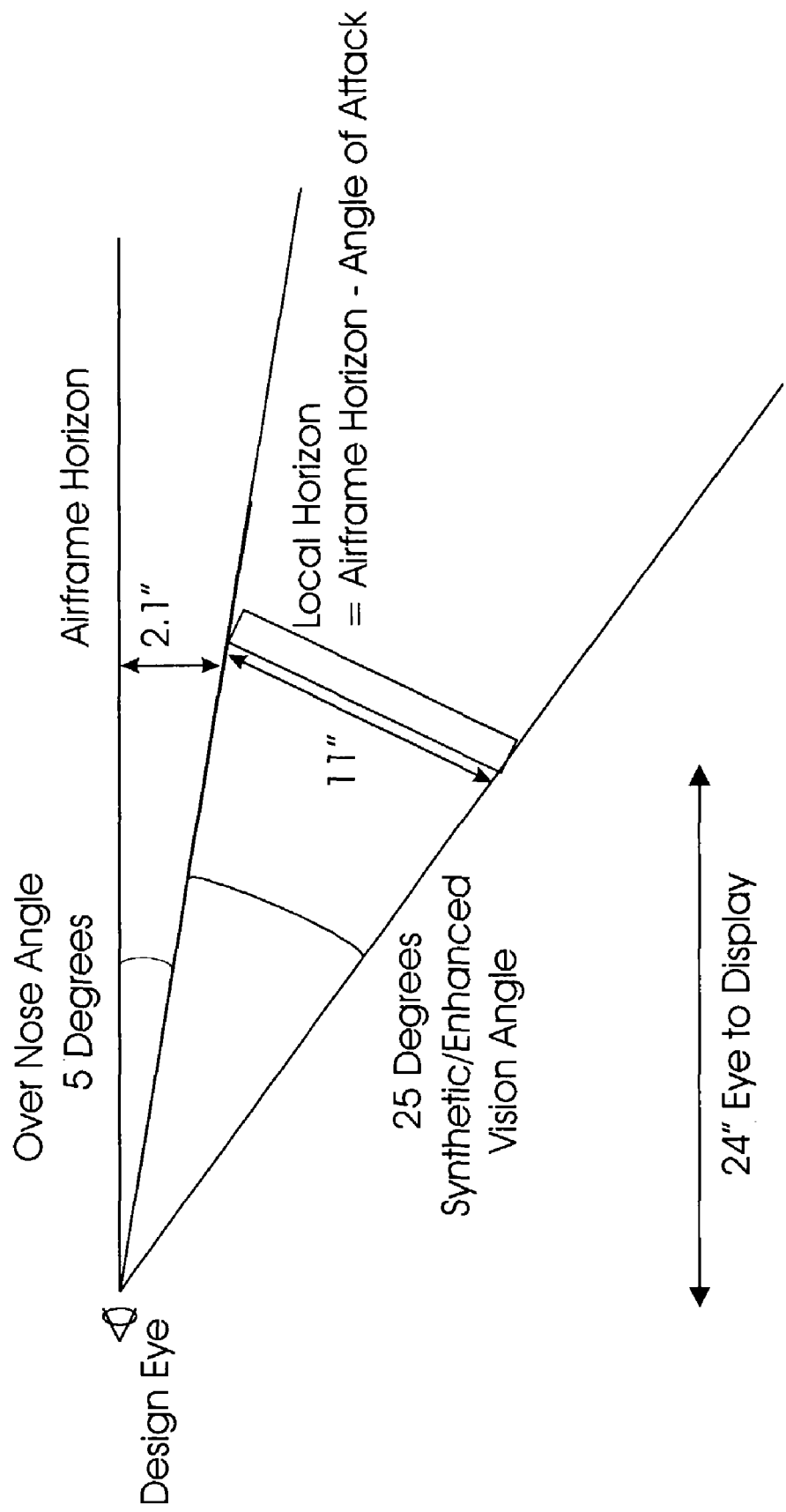
FIG. 4C is a side-view diagram of the particular embodiment of the display system of FIG. 4B.

FIGS. 4B and 4C show front and side view diagrams of a particular geometric configuration of displays 100, 428, 430 that can be included in an embodiment of display system 400 of FIG. 4A. The design eye represents the position of each crewmember's eye. Typically, the design eye refers to the $50^{th}$ percentile (eye height) pilots eye position, with the seat at its neutral seat reference point, when the pilot is seated at the location typically used to fly the aircraft. Current design practices use a design eye ellipse or line that enables $5^{th}$ through $95^{th}$ percentile operators to have the same over the nose vision capability. This allows the larger pilots to sit higher up and further away from the main instrument panel, etc. Displays 100, 428, 430 are flat panel display devices, with active display areas of 18 by 11 inches, 15 by 12 inches, and 8 by 8 inches, respectively. Other display sizes can be utilized. The active area of displays 100 provide a −20 to +20 degree horizontal field of view, and a −10 to −30 degree vertical field of view, twenty-four (24) inches from each crewmember's design eye. The outline of display 100 from the pilot's design eye is shown in FIG. 1B. Display system 400 (FIG. 4A) can be utilized with other displays 100, 428, 430, and crewmember position configurations.

Display management functions (not shown) can cause certain types of information to be automatically assigned to a particular window of display 100 based on the purpose for which display 100 is being used. For example, the Federal Aviation Administration requires certain primary flight information to be available to the crewmembers at all times during flight. Accordingly, the primary flight information can be automatically placed in fixed locations on display 100, depending on the aircraft's flight phase, and the role being performed by a particular crewmember. Under certain circumstances, each crewmember can then configure the remaining windows of display 100 based on their own preferences and/or current operational requirements.

In some embodiments, display processor 52 presents a default window configuration for each crewmember based on the crewmember's role, and the operational state of the aircraft. Display 100 can include options to select between different roles that a crewmember can assume. For example, a crewmember can choose between role options as primary pilot, co-pilot, flight engineer, maintenance personnel, or flight attendant. When a crewmember switches from one role to another, the default configuration for the new role can automatically replace the information displayed on the crewmember's display 100. The default window configurations can be preset by the crewmember to display information and options that are preferred by the crewmember when performing each particular role. A default set of options and information can be presented that is most likely to be useful to the crewmember assuming the role.

The embodiment of display system 50 in FIG. 4A includes display processor 52, which receives inputs from the subsystems and sensors 404 and the crewstation(s) including positions of switches and knobs (not shown), control sticks 406, 408, throttle levers 410, 412, and rudder pedals (not shown). Displays 100, 428, 430, control sticks 406, 408, and throttle levers 410, 412 can include a variety of switches for controlling the operational modes of displays 100, 428, 430, and subsystems and sensors 404.

Display processor 52 includes logic to determine whether the modes requested by the crewmembers are permitted based on the current mode of the components. Display processor 52 also provides data from subsystems and sensors 404 and other aircraft components, as well as the operational mode of subsystems and sensors 404, to display processor 52, which generates avionics displays 416 and any other indicators, such as lights and sounds. Mode control and option selections are also output from display processor 52 to control operational modes of various subsystems and sensors 404.

One or more of windows 1A through 3B, such as windows 1C, 2C, and/or 3B, can be designated as common windows associated with a subset of two or more of the remaining windows 1A, 1B, 2A, 2B, 3A. For example, window 1C can be a common window associated with windows 1A through 1B; window 2C can be a common window associated with windows 2A through 2B; while window 3B can be independent of other windows 1A through 3A. Other arrangements and combinations of window and common windows can be utilized based on the types of information a user will be viewing, and the utility of having a common window 1C, 2C associated with two or more of the other windows 1A, 1B, 2A, 2B, 3A.

An option area 432, 434, 436 can be associated with each common window 1C, 2C, and window 3B, respectively, to allow the user to customize the information in windows 1C, 2C, and 3B. The capability to customize the information in one or more windows 1C, 2C, and 3B provides user configurable workspace on display 100 while retaining the information in the other windows. For example, options area 422 can include several options for displaying more detailed information in common window 1C that is related to the information displayed in either of windows 1A or 1B. Common window 1C can include a scroll feature to allow the user to scroll through the detailed information, while the less detailed information continues to be displayed in windows 1A and/or 1B.

Display processor 52 can be configured to determine when functions being performed in display system 50 are in a predefined state. Display processor 52 can also monitor the operational status of various components in display system 50. When display processor 52 detects one of the predefined states, relevant information regarding the state can be presented in one of windows 1A, 1B, 2A, 2B, 3A, or 3B. In some circumstances, the crewmember cannot change the information regarding the state while the aircraft remains in the state. The crewmember can, however, choose options associated with the respective window 1C, 2C, or 3B to retrieve more information about the detected state, as well as information related to the information in other associated windows 1A, 1B, 2A, 2B, 3A.

In some embodiments, display 100 covers the entire visible display area of the display device. Additionally, windows 1A through 3B do not overlap each other, thereby providing the user with an unobstructed view of all the information on display 100.

The selectable features in option areas 432, 434, 436 that allow the crewmember to customize windows 1C, 2C, and 3B can be implemented in any suitable manner, such as computer-generated graphic features that are selectable via a touch screen overlaid on display 100, a movable cursor on display 100, and/or with hardware features such as pushbutton switches that are mounted adjacent display 100. In other embodiments, the selectable options to customize common windows 1C, 2C, and 3B can be located on other components of display system 50, or other suitable areas, that are accessible by a user. In some embodiments, a voice recognition system can be included to interact with displayed information.

Other techniques for controlling the appearance of display 100 can also be provided, such as automatic and manual declutter display modes, color-coding, and display scaling. Further, other combinations of information and number/size of windows can be implemented for display 100. A lock out feature can also be included to help crewmembers coordinate their efforts by preventing them from attempting to control operation of the same subsystem simultaneously. Alternatively, control can be given to the last crewmember that makes an input.

Figure 6:
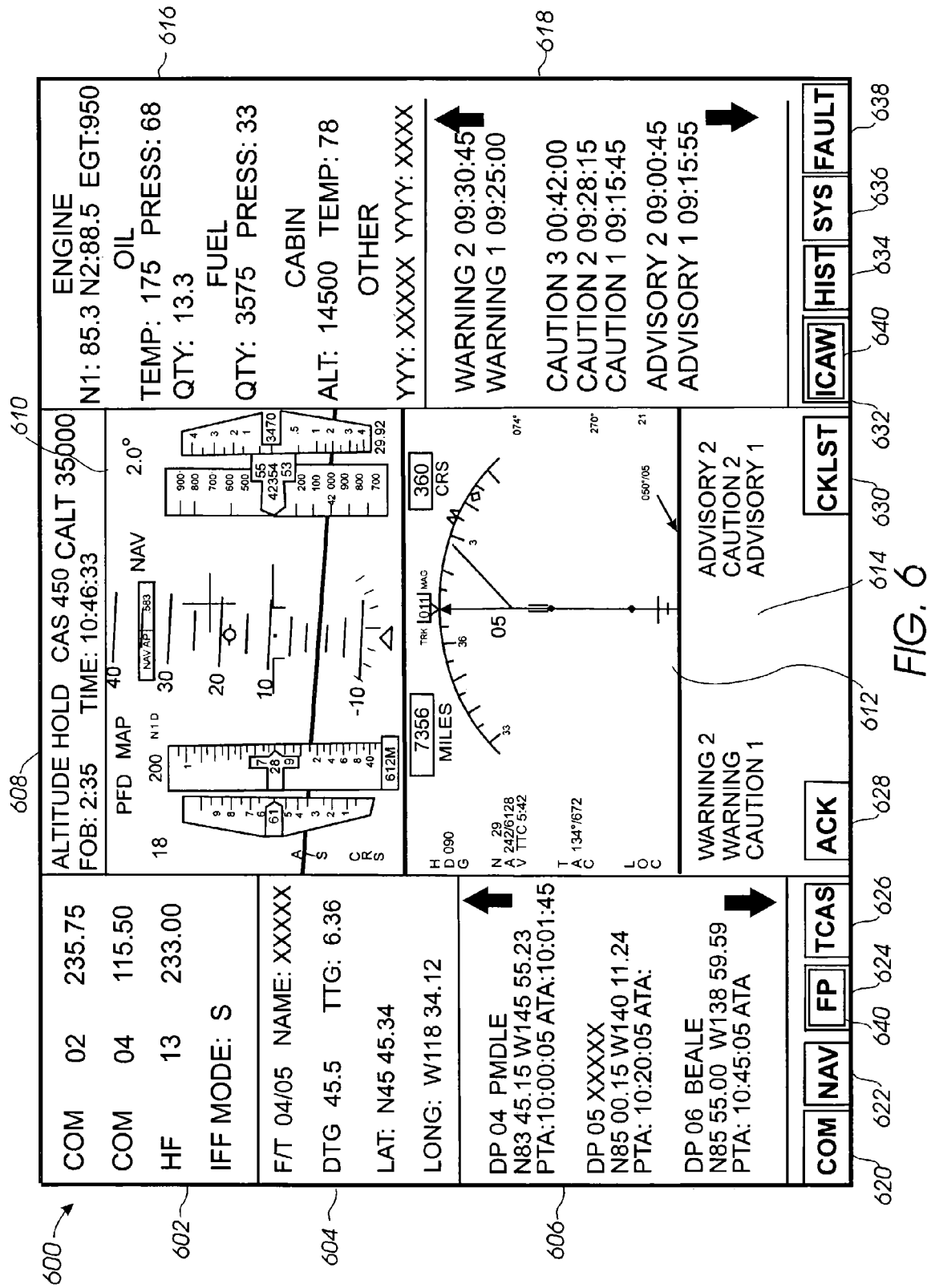
FIG. 6 is a diagram of an embodiment of another avionics display generated by the display system of FIG. 4A.

FIG. 6 shows an embodiment of avionics display 600 that includes information regarding avionics subsystems and sensors 404 (FIG. 4A). Display 600 includes communication system window 602, navigation window 604, common window 606 (currently displaying navigation waypoint information), primary information window 608, Attitude Director Indicator (ADI) window 610, Horizontal Situation Indicator display (HSID) window 612, common window 614 (currently displaying caution and warning information), engine status window 616, and common window 618 (currently displaying cautions and warnings information). ADI window 610 provides flight attitude, altitude, speed, and navigation steering information. HSID window 612 provides aircraft attitude, steering, and navigation information superimposed on a moving map of the geographic area around the aircraft.

The embodiment of avionics display 600 shown in FIG. 6 also includes communication subsystems (COM) option 620, navigation subsystems (NAV) option 622, flight planning subsystem (FP) option 624, traffic alert and collision avoidance subsystem (TCAS) option 626, acknowledge (ACK) option 628, checklist (CKLST) option 630, integrated cautions and warnings (ICAW) subsystem option 632, subsystem history (HIST) option 634, subsystem (SYS) option 636, and subsystem diagnostics (FAULT) option 638. Crewmembers can choose options 620 through 638 to view more detailed information about the aircraft's operation and subsystems in common windows 606, 614, and 618.

The options shown for common window 606 include Com option 620 to view more detailed information regarding the aircraft's communication system 604; NAV option 622 to view information about various aspects of navigating the aircraft; FP option 624 to review and modify the aircraft's flight plan; and TCAS option 626 to view more information regarding other aircraft or obstacles in the vicinity of the aircraft. When a particular one of options 620 through 626 is selected, an indicator of the option selected, such as selected box 640 or lighted pushbuttons, can be utilized. For example, a green light can indicate a selected option, and white light can indicate the option is available for selection.

When a particular one of options 620 through 626 is selected, the information in common window 606 changes to display information requested by the user. A display option tree can be implemented to allow each crewmember to access increasingly detailed levels of information in common windows 606, 614, 618 independently from one another. While a first crewmember is monitoring engine performance, for example, the other crewmember can view and change the flight plan. Additionally, when COM option 620 is selected by one crewmember, options 620 through 626 on his display 600 change to another set of options to access another level of information that is available for the selected COM option 620. The sublevels include a feature, such as a BACK option, to return to the previous level. In the meantime, the information on the other crewmember's display 600 is unaffected, unless the option selected by the first crewmember changes the operating mode or other information that is common to both displays 600.

Acknowledge (ACK) option 628 and checklist (CKLST) option 630 are associated with the Integrated Caution Advisory and Warning subsystem (ICAW) 606. In the embodiment of display 600 shown, messages generated by ICAW system 606 appear in window 614. A limited number of individual ICAW messages can appear at one time in window 614, and additional information about the messages can appear in window 618 when ICAW option 632 is selected. The ICAW messages in window 614 can be cleared by selecting ACK option 628. When additional messages are available, they replace the caution and warning messages that are cleared when ACK option 628 is selected.

ICAW subsystem (not shown) includes an electronic checklist feature that is accessed via CKLST option 630. When an ICAW message is displayed in window 614, the crewmember can depress CKLST option 630 to view the associated checklist in window 614. When multiple ICAW messages occur, the crewmember can move an indicator over the desired ICAW and select ICAW option 632 to view a checklist for the problem indicated by the message. Associated checklists can be automatically linked together so that if an engine failure occurs, the pilot will not only get the checklist for the engine failure procedure in-flight but also the single engine landing checklist. Crewmembers can also manually page through the checklists at any time by selecting CKLST option 630.

Subsystem history (HIST) option 634 can be selected to display operational history for the subsystem selected with subsystem (SYS) option 636. FAULT option 638 can be selected to initiate diagnostic procedures, commonly referred to as Built-in-Tests (BIT), on the selected subsystem. The results of the BIT are displayed in window 618.

In some embodiments, central computer 516 determines whether the aircraft is in a predefined state, and instructs display processor 52 (FIG. 4A) to display predefined information in at least one of windows 602 through 616 while the aircraft remains in the predefined state. Additionally, options 620 through 638 can be changed or enabled/disabled depending on the aircraft state. For example, when the aircraft is on final approach to land, one or both of the crewmember's displays 600 can be forced to display primary flight information or other information considered necessary to conduct that portion of the flight in windows 610 and 612, as well as other windows on display 600.

Various other techniques for controlling the content in common windows 606, 614, and 618 can be provided. For example, a "drag and drop" feature can be provided as another method of displaying more detailed information about one or more of the subsystems. The drag and drop feature allows a user to select a word or other item in one of windows 602, 604, 608, 610, 612, or 616, and drag the selection to one of common windows 606, 614, or 618. Information regarding the selected item is then displayed in the common window in which the item was dropped. For example, selecting a particular caution in window 614 and dropping it in window 618 would cause information regarding the relevant subsystem to be displayed in window 618.

Other techniques for controlling the appearance of display 600 can also be provided, such as automatic and manual declutter display modes, voice recognition and response systems, color-coding, and display scaling. Further, other combinations of information and number/size of windows can be implemented for display 600. A lock out feature can also be included to help crewmembers coordinate their efforts by preventing them from attempting to control operation of the same subsystem simultaneously. Alternatively, control can be given to the last crewmember that makes an input.

Figure 5:
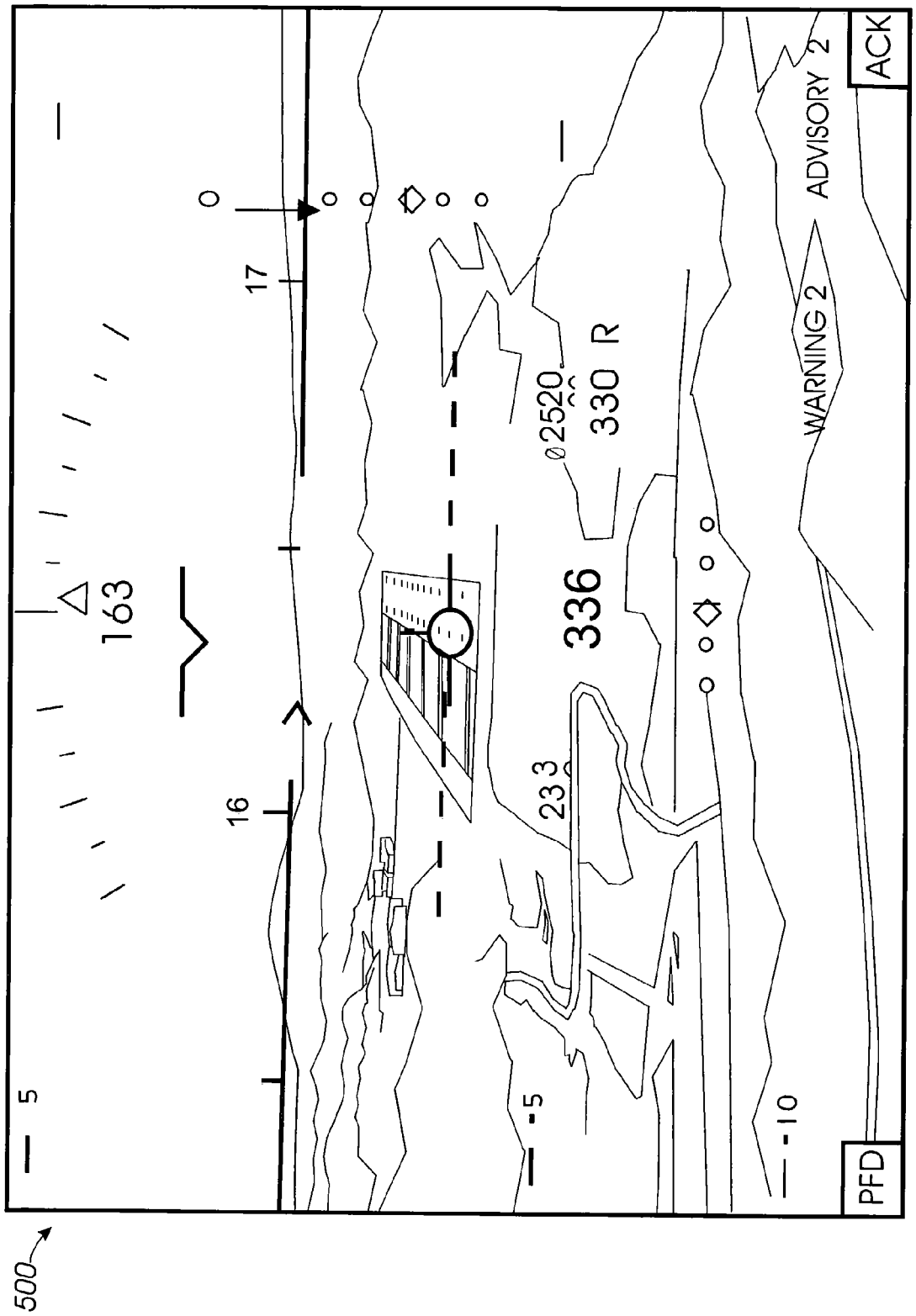
FIG. 5 is a diagram of an embodiment of an avionics display generated by the display system of FIG. 4A.

Referring to FIGS. 4A, 5, and 6, display 428 can be used to provide access to avionics display 600 when display processor 52 forces primary flight display 500 on the pilot-in-command's display 100. Display 428 can also be used to present other types of displays to the crewmembers, in addition to, or instead of, displays 500 and 600.

Referring again to FIGS. 1 and 2, display 100 minimizes the number of dedicated control panels and display devices that are typically used to monitor and operate an aircraft and its subsystems, while providing portions of the out-the-window field of view that is obscured by the aircraft's outer mold line (OML) 202. A reduced number of display devices results in decreased weight, increased system reliability, and reduced maintenance. Further, displays 100 provide enhanced situational awareness of the aircraft and the subsystems, and reduce crew workload from typical pilot-vehicle interfaces.

Aircraft display system 400 (FIG. 4A) was discussed herein as an example of a type of system in which various embodiments of display 100 can be used to provide a portion of desired FOV 102 (FIG. 1B) as well as to monitor and control a large number of subsystems and sensors 404 (FIG. 4A). It is anticipated that embodiments of display 100, or group of displays 100, will be useful in providing an expanded field of view for operators of a wide variety of systems that have limited out-the-window visibility.

While the present disclosure describes various embodiments of display systems that can be used in a device with reduced out-the-window visibility, it will be understood that many variations and modifications of the embodiments disclosed herein may be made while remaining within the scope of the following claims. These embodiments are illustrative and the scope of the claims is not limited to them. For example, those having ordinary skill in the art will readily implement the processes necessary to provide the structures and methods disclosed herein, and will understand that materials, dimensions, processes, and other parameters can be varied to achieve desired apparatus, methods, and systems within the scope of the following claims.

What is claimed is:

1. A display system for a device, comprising:
computer executable instructions operable to:
  receive images from a first sensor and a second sensor representing scenery outside the device;
  detect moving objects in the images;
  fuse the images to a single viewpoint;
  transform the fused image to a first viewpoint image from a first operator station in the device and a second viewpoint image from a second operator station in the device, wherein the first and second viewpoint images conform to the scenery outside the device from each operator station; and
  generate a third display area associated with at least two mutually exclusive windows of information on a display device for the first operator station, the display device is mounted in an instrument panel of the device and the third display area and the two mutually exclusive windows of information are presented on the display device;
  generate a third display area associated with at least two mutually exclusive windows of information on another display device for the second operator station, the other display device is mounted in the instrument panel of the device and the third display area and the two mutually exclusive windows of information are presented on the display device;
  wherein the third display areas can be customized independently by the operators to display detailed information related to the information displayed in the associated windows and the first and second viewpoint images are displayed on the respective display devices.

2. The display system of claim 1, further comprising:
computer executable instructions operable to:
  combine the first and second viewpoint images with symbols, wherein the symbols represent information regarding the operational state of the device and the moving objects detected in the images.

3. The display system of claim 1, wherein the instructions for detecting moving objects in the first sensor image are configured to execute in a first processor, and the instructions for detecting moving objects in the second sensor image are configured to execute in a second processor simultaneously with the instructions in the first processor.

4. The display system of claim 3, wherein the instructions for transforming the fused image to the first viewpoint image are configured to execute in the first processor, and the instructions for transforming the fused image to the second viewpoint image are configured to execute in the second processor.

5. The display system of claim 2, wherein the symbols represent the moving objects in the vicinity of the device.

6. The display system of claim 2, wherein at least one of the first and second viewpoint images include environmental information for the area where the device is operating.

7. The display system of claim 2, wherein the symbols represent weather hazards in the vicinity of the device.

8. The display system of claim 2, wherein the computer executable instructions are further operable to receive an enhanced image from a third sensor configured to provide an image of the out-the-window scenery in low-visibility conditions.

9. The display system of claim 8, wherein the computer executable instructions are further operable to fuse the single viewpoint image with the enhanced image.

10. The display system of claim 9, wherein the computer executable instructions are further operable to utilize data from at least one position sensor to determine the location of the objects with respect to the device.

11. The display system of claim 2, wherein the computer executable instructions are further operable to utilize data from off-board data sources regarding the objects.

12. The display system of claim 1, wherein the first sensor and the second sensor are video cameras.

13. The display system of claim 8, wherein the third sensor is a RADAR sensor.

14. The display system of claim 8, wherein the third sensor is a FLIR sensor.

15. A method for providing an out-the-window visual scene on a display device, comprising:
  receiving an image of a portion of the out-the-window visual scene from the viewpoint of a first type of sensor;
  receiving another image of a portion of the out-the-window visual scene from the viewpoint of another of the first type of sensor;
  fusing the images from the first type of sensors into a combined image to generate a first fused image;
  transforming the fused image to a first operator viewpoint and to a second operator viewpoint; and
  outputting the first operator viewpoint image to a first display device and the second operator viewpoint image to a second display device, wherein the display devices are positioned in an instrument panel to provide the portion of a desired out-the window visual scene in combination with a window that provides another portion of the desired out-the-window visual scene, and the viewpoint images are aligned with and scaled to conform to the out-the-window visual scene; and
  generating a common display area associated with at least two mutually exclusive windows of information on each of the display devices, wherein the common display area can be customized by the operator to display detailed information related to the information displayed in the associated windows.

16. The method of claim 15, further comprising detecting objects in the first fused image from the first type of sensor.

17. The method of claim 16, further comprising combining the first fused image with symbols representing the objects.

18. The method of claim 15, further comprising transforming the first operator viewpoint image and the second operator viewpoint image to conform to the out-the-window visual scene.

19. The method of claim 15, further comprising fusing the first fused image with an enhanced image of a portion of the out-the-window scenery from at least one of the group of a RADAR sensor and a FLIR sensor, to generate a second fused image.

20. The method of claim 15, further comprising fusing the second fused image with an enhanced image of a portion of the out-the-window scenery from at least one of the group of a RADAR sensor and a FLIR sensor, to generate a second fused image.

21. The method of claim 20, further comprising: transforming the second fused image to the first operator viewpoint and to the second operator viewpoint.

22. The method of claim 19, further comprising: providing portions of the transformed image with data from a terrain map database.

23. A device, comprising:
a display device; and
a display processor operable to:
receive a first sensor image representing a portion of scenery outside the device;
transform the first sensor image to a viewpoint image from an operator station in the device, wherein the viewpoint image is sized and oriented to conform to the scenery outside the device from the operator station; and
output the first operator viewpoint image to the display device, wherein the display device is positioned in an instrument panel to provide the portion of a desired out-the-window visual scene in combination with a window that provides another portion of the desired out-the-window visual scene, and the viewpoint image is aligned with and scaled to conform to the out-the-window visual scene;
wherein the display processor is further operable to generate a common display area associated with at least two mutually exclusive windows of information on the display device, wherein the common display area can be customized by the operator to display detailed information related to the information displayed in the associated windows.

24. The device of claim 23, wherein the display processor is further operable to combine the viewpoint image with symbols, wherein the symbols represent information regarding the operational state of the device and the moving objects detected in the images.

25. The device of claim 23, wherein the display processor is further operable to detect moving objects in the first sensor image.

26. The device of claim 23, wherein the display processor is further operable to generate symbols representing moving objects in the sensor image and the operational state of the device.

27. The device of claim 23, wherein the display processor is further operable to generate symbols representing weather hazards in the vicinity of the device.

28. The device of claim 23, wherein the display processor is further operable to receive an enhanced image of the out-the-window scenery in low-visibility conditions from a second sensor.

29. The device of claim 28, wherein the display processor is further operable to fuse the viewpoint image with the enhanced image.

30. The device of claim 25, wherein the display processor is further operable to utilize data from at least one position sensor to determine the location of the objects with respect to the device.

31. The device of claim 25, wherein the display processor is further operable to utilize data from off-board data sources regarding the objects.

32. The device of claim 23, wherein the sensor is a video camera.

33. The device of claim 28, wherein the second sensor is a RADAR sensor.

34. The device of claim 28, wherein the second sensor is a FLIR sensor.

35. An aircraft, comprising:
a crewstation with cockpit windows;
a first display device for one crewmember;
a second display device for another crewmember; and
a display processor operable to:
receive an image of an out-the-window visual scene from the viewpoint of a first type of sensor;
receive another image of a portion of the out-the-window visual scene from the viewpoint of another of the first type of sensor;
fuse the images from the first type of sensors into a combined image to generate a first fused image;
transform the fused image to a first operator viewpoint and to a second operator viewpoint;
transform the first operator viewpoint image and the second operator viewpoint image to conform to the size and orientation of the out-the-window visual scene; and
output the first operator viewpoint image to the first display device and the second operator viewpoint image to the second display device, wherein the display devices are positioned in an instrument panel to provide the portion of a desired out-the window visual scene in combination with a cockpit window that provides another portion of the desired out-the-window visual scene, and the viewpoint images are aligned with and scaled to conform to the out-the-window visual scene;
wherein the display processor is further operable to generate a common display area associated with at least two mutually exclusive windows of information on each display device, wherein the common display area can be customized by the operator to display detailed information related to the information displayed in the associated windows.

36. The aircraft of claim 35, wherein the display processor is further operable to detect objects in the first fused image from the first type of sensor.

37. The aircraft of claim 36, wherein the display processor is further operable to combine the first fused image with symbols representing the objects and primary flight information for the aircraft.

38. The aircraft of claim 35, wherein the display processor is further operable to fuse the first fused image with an enhanced image of a portion of the out-the-window scenery from at least one of the group of a RADAR sensor and a FLIR sensor, to generate a second fused image.

39. The aircraft of claim 38, wherein the display processor is further operable to fuse the second fused image with an enhanced image of a portion of the out-the-window scenery from at least one of the group of a RADAR sensor and a FLIR sensor, to generate a second fused image.

40. The aircraft of claim 39, wherein the display processor is further operable to transform the second fused image to the first operator viewpoint and to the second operator viewpoint.

41. The aircraft of claim 40, wherein the display processor is further operable to provide portions of the transformed images using data from a terrain map database.

42. The aircraft according to claim 35 further comprising:
a terrain database coupled to provide the display processor with at least a portion of the required out-the-window field of view on the display device.

43. The aircraft of claim 35, wherein the display processor is further operable to display one of the operator viewpoint displays to the operator acting as pilot in command of the aircraft during a predefined aircraft operational state, and to allow the pilot in command to choose an option on the display device to view detailed information about the aircraft and aircraft subsystems during other aircraft operational states.

* * * * *